US012643201B2

(12) United States Patent
Tünkers

(10) Patent No.: US 12,643,201 B2
(45) Date of Patent: Jun. 2, 2026

(54) CLAMP FOR AUTOMOBILE MANUFACTURING INDUSTRY

(71) Applicant: Olaf und André Tünkers GbR, Ratingen (DE)

(72) Inventor: Josef-Gerhard Tünkers, Ratingen (DE)

(73) Assignee: Olaf und André Tünkers GbR, Ratingen (DE)

( * ) Notice: Subject to any disclaimer, the term of this patent is extended or adjusted under 35 U.S.C. 154(b) by 337 days.

(21) Appl. No.: 18/456,940

(22) Filed: Aug. 28, 2023

(65) Prior Publication Data

US 2025/0073854 A1 Mar. 6, 2025

(51) Int. Cl.
*B25B 5/00* (2006.01)
*B25B 5/06* (2006.01)

(52) U.S. Cl.
CPC .................................... *B25B 5/061* (2013.01)

(58) Field of Classification Search
CPC .. B25B 5/00; B25B 5/06; B25B 5/064; B25B 5/122
See application file for complete search history.

(56) References Cited

U.S. PATENT DOCUMENTS

2008/0179804 A1* 7/2008 McIntosh ................ B25B 5/087 269/32
2010/0044942 A1* 2/2010 Tamai ..................... B25B 5/122 269/228
2015/0145194 A1* 5/2015 Kaiser ................. B29C 33/3842 269/32
2019/0184526 A1* 6/2019 Terasaki .................... B25B 5/04
2020/0101583 A1* 4/2020 Kang ......................... B25B 5/04
2021/0154800 A1* 5/2021 Jacobson ................ B25B 5/003
2025/0073854 A1* 3/2025 Tünkers .................. B25B 5/122

* cited by examiner

*Primary Examiner* — Lee D Wilson
(74) *Attorney, Agent, or Firm* — FITCH, EVEN, TABIN & FLANNERY, LLP

(57) ABSTRACT

The invention relates to a clamp for use in manufacturing automobile bodies for the automotive industry that is used to clamp and hold metal plate components in place. It is demonstrated how a parallel movement of a pivotal clamping lever is defined with just one component, using simple means.

5 Claims, 2 Drawing Sheets

CLAMP FOR AUTOMOBILE MANUFACTURING INDUSTRY

The invention relates to a clamp for use in manufacturing automobile bodies for the automotive industry that is used to clamp and hold metal plate components in place, which has a chuck and a pneumatic or electric drive dedicated to the chuck, wherein the drive moves a rod-shaped actuator in opposing vertical directions, wherein the actuator pivots an operating lever inside the chuck within a predefined angular range about a pivot axle in the chuck at its end, the longitudinal axis of which is orthogonal to the longitudinal axis of the rod-shaped actuator, and the operating lever is also pivotally connected to a force-transferring arm by a force-transferring arm pivot axle at its end opposite the pivot axle, and the force-transferring arm pivots a clamping arm support axle that can move in opposing vertical directions in the chuck, and the operating lever is flat on the side facing the end of the chuck and forms a two-armed lever at the upper end of the movement of the rod-shaped actuator with a thrust bearing in the chuck when it is moved downward, and the clamping arm exerts a constant or nearly constant clamping force on the metal plate component that is to be clamped in place over a clamping area to the end of the clamp when it moves downward, parallel to the upward movement of the rod-shaped actuator, when it comes in contact with the metal plate component, wherein the operating lever has an integrally formed cam-shaped actuating lobe on its flat side facing the thrust bearing in the chuck, which rises smoothly and gradually from the flat side toward the force-transferring arm pivot axle, and imposes a vertical movement on the force-transferring arm and the clamping arm support axle in the chuck when it comes in contact with the thrust bearing, and the force-transferring arm is braced against a pin-like sliding element in one or both halves or parts of the chuck, such that a defined vertical movement is obtained.

PRIOR ART

Clamps in the form of toggle lever clamps have been disclosed in both DE 10 2018 002 358 and DE 10 2018 002 359.

DE 10 2021 000 171 B3 describes a toggle lever clamp with an operating lever that has an integral actuating lobe on its flat side facing a thrust bearing in the chuck, which unlike the straight back of the toggle bar can also be curved in a convex manner in relation to the thrust bearing. The actuating lobe defines the parallel movement of the clamping arm when force is applied. In the clamped position, i.e. when the clamping arm is tightened down, the longitudinal axis is at 90° to a line passing through the middle of the housing along the longitudinal axis thereof, which is then also 90° to the longitudinal axis of the spindle. The operating lever has an integral actuating lobe starting at a distance to the force-transferring arm pivot axle that rises away from the flat side of the metal operating lever and then slopes back down at the end thereof, which defines the parallel application of force exerted on the metal plate component by the clamping arm. The actuating lobe can be shaped like a cam, which rises smoothly and gradually from the flat side toward the force-transferring arm pivot axle and exerts a direct force on the force-transferring arm when it bears against the thrust bearing in the housing, and on the clamping arm support axle, which can move in a straight line in the chuck. The flat side of the operating lever facing the thrust bearing in the chuck is at an acute angle to the center of the pivoting range of the pivot axles at the ends of the operating lever, forming a sloped plane, the angle of which defines the direction of force exerted in a straight line on the force-transferring arm.

DE 10 2018 002 358 A1 also describes a toggle lever clamp for use in manufacturing automobile bodies in the automotive industry, used for clamping and holding components in place, which has a housing, a drive for the housing, which moves a pivotal clamping arm in opposing directions with an actuator and via a toggle lever assembly to clamp the component onto a surface, in which there is at least one bearing element on the toggle lever assembly, which forms a lever with multiple arms at the upper end of the movement of the actuator with a thrust bearing in the housing that forms a chuck, and the clamping arm exerts a constant or nearly constant clamping force over a predefined clamping area to the end thereof in accordance with a predetermined selection of the leverage ratio of the toggle lever assembly with parallel movements that is applied to the component that is to be clamped in place. This publication also describes a toggle lever assembly in which a toggle lever hinge element forms a two-armed rocker lever with a thrust bearing that it bears against inside the housing in the form of a chuck when in the clamping position, in which the clamping arm exerts a nearly constant clamping force on the component that is to be clamped with this rocker lever a few millimeters from the end of the clamp when the actuator is moved in the opposite, parallel direction. The bearing element is a rotating roller bearing that interacts smoothly with the thrust bearing in the chuck. The moving bearing element can comprise one or more roller bearing elements in a bearing race surrounding a rotating axle parallel to the pivot axle for the toggle lever hinge element. This can also be a needle bearing.

DE 10 2018 002 359 A1 also relates to a toggle lever clamp for use in manufacturing automobile bodies in the automotive industry, for clamping and holding components in place, which has a housing and a drive for the housing, which moves a pivotal clamping arm in opposing directions with an actuator via a toggle lever assembly in order to clamp the component onto a surface, in which a toggle lever hinge element forms a dual rocker lever with a roller bearing in the housing when it bears thereon, and the clamping arm is at 90° to the axis of the respective direction of movement after it has been pivoted into the clamping position by the rocker lever, and the clamping arm exerts a nearly constant force on the relevant component when it is moved a few millimeters from this position. A toggle lever hinge in the chuck interacts with a roller bearing in the housing in the manner of a dual rocker lever, such that the clamping arm exerts a nearly constant clamping force on the relevant component with this rocker lever a few millimeters from the end of the clamp when the actuator is moved in the opposite direction.

DE 2014 111 344 A1 describes a clamp that comprises a rotational expansion shaft connected to a clamping element for conjoint rotation, and an actuating mechanism connected to the expansion shaft, with which a linear movement is converted into a rotational movement of the expansion shaft with, in which the expansion shaft comprises an inner shaft and a sleeve encompassing the inner shaft that is connected to the actuating mechanism, in which the inner shaft connected to the clamping element for conjoint rotation can be slid radially in relation to the main axis of rotation for the expansion shaft within the outer sleeve, but cannot rotate therein, and there is a actuator connected to the inner shaft with which the inner shaft is held in place in relation to the sleeve. This structure is also characterized in that the actuator is preferably formed by a cylindrical pin that is permanently connected to the inner shaft, which passes through a hole in the outer sleeve and is connected to the actuating mechanism thereon. To pivot the expansion shaft, there is a lever on the outer sleeve that is hinged to an intermediate link, wherein the pin, which has a contact surface on its end facing away from the inner shaft, interacts with an actuating lobe on the intermediate link.

OBJECT OF THE INVENTION

Based on the prior art specified above, the fundamental object of the invention is to ensure an efficient application of force to a force-transferring arm that moves the clamping arm support axle through the shape of the operating lever moved by the rod-shaped actuator and its relationship to a thrust bearing.

Solving the Problem Addressed by the Invention

The problem described above is solved by a clamp for use in manufacturing automobile bodies for the automotive industry that is used to clamp and hold metal plate components in place, the clamp including a chuck and a pneumatic or electric drive dedicated to the chuck, wherein the drive moves a rod-shaped actuator in opposing vertical directions (C-D), wherein the actuator pivots an operating lever inside the chuck within a predefined angular range about a pivot axle in the chuck at an end of the operating lever, the longitudinal axis of the pivot axle is orthogonal to the longitudinal axis of the rod-shaped actuator, and the operating lever is also pivotally connected to a force-transferring arm by a force-transferring arm pivot axle at an end of the operating lever opposite end of the operating lever provided with the pivot axle, and the force-transferring arm pivots a clamping arm support axle that can move in opposing vertical directions (T-V) in the chuck. The operating lever is flat on the side facing the end of the chuck and forms a two-armed lever at the upper end of the movement of the rod-shaped actuator with a thrust bearing in the chuck when it is moved downward (V), and the clamping arm exerts a constant or nearly constant clamping force on the metal plate component that is to be clamped in place over a clamping area to the end of the clamp when it moves downward (V), parallel to the upward movement (C) of the rod-shaped actuator, when it comes in contact with the metal plate component, wherein the operating lever has an integrally formed cam-shaped actuating lobe on a flat side of the operating lever facing the thrust bearing in the chuck, which rises smoothly and gradually from the flat side toward the force-transferring arm pivot axle, and imposes a vertical movement (V) on the force-transferring arm and the clamping arm support axle in the chuck when it comes in contact with the thrust bearing, and the force-transferring arm is braced against a shaped sliding element in one or both halves or parts of the chuck, such that a defined vertical movement (V-T) is obtained. The connecting line between the pivotal center of the clamping arm support axle and the force-transferring arm pivot axle forms a straight line in the clamped position, and the extension of this connecting line runs in a straight line through the middle of the thrust bearing.

Some Advantages

The special relationship of the cam-shaped lobe to the thrust bearing results in a reliable transfer of force to the force-transferring arm.

FURTHER INVENTIVE EMBODIMENTS

Further inventive embodiments are described below.

In one further embodiment, the sliding element is inserted into the recess in the chuck.

In another further embodiment, the clamp is characterized in that the parallel movement by the clamping arm is a few millimeters, e.g. ±4 millimeters.

Another embodiment is characterized in that the distance between the middle of the thrust bearing and the middle of the force-transferring arm pivot axle when the operating lever is in the clamping position is 18 millimeters, and the distance between the rotational center of the force-transferring arm pivot axle and the cam-shaped actuating lobe is 12 millimeters, and when the clamping arm is open, the distance decreases from 18 millimeters to 14 millimeters, and from 12 millimeters to 8 millimeters.

The rod-shaped actuator, operating lever, all of the hinges, the force-transferring arm, clamping arm support axle, and clamping arm are made of metal, in particular a steel alloy.

The invention is illustrated—in part schematically—in the drawings. Therein:

Figure 2:
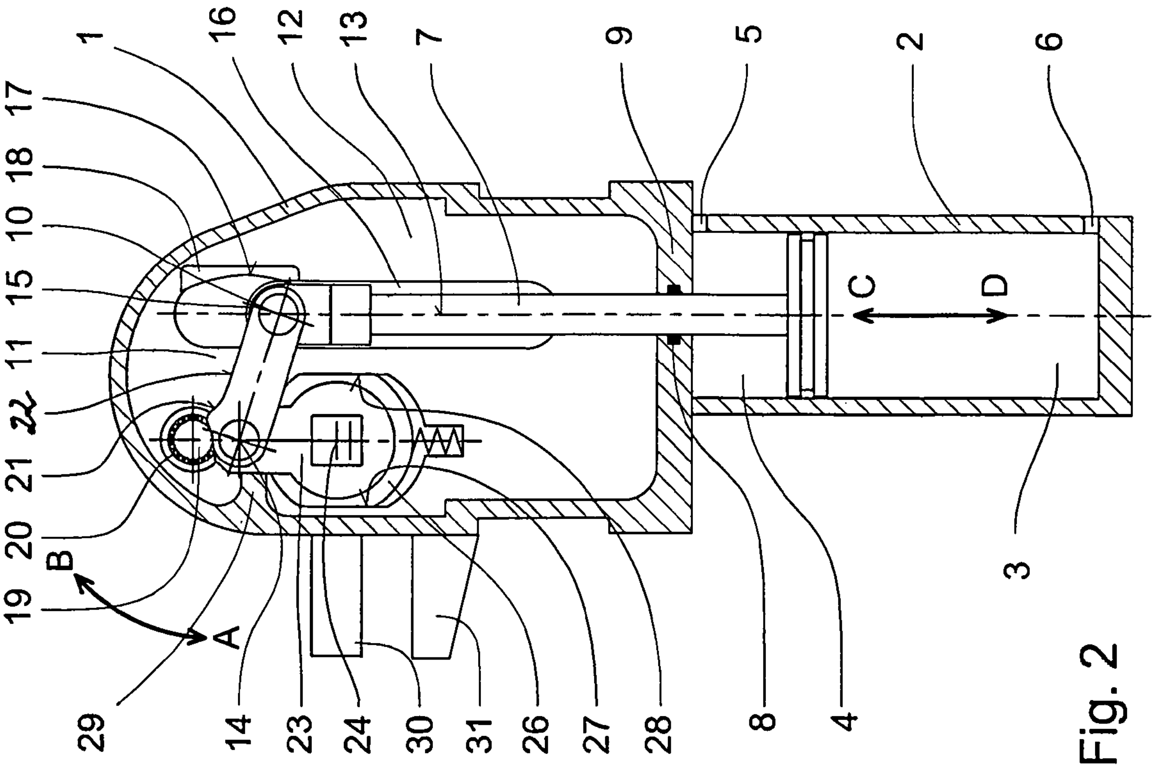
FIG. 2 shows the clamp from FIG. 1 in an intermediate position, in which the actuating lobe bears against the thrust bearing.
Figure 1:
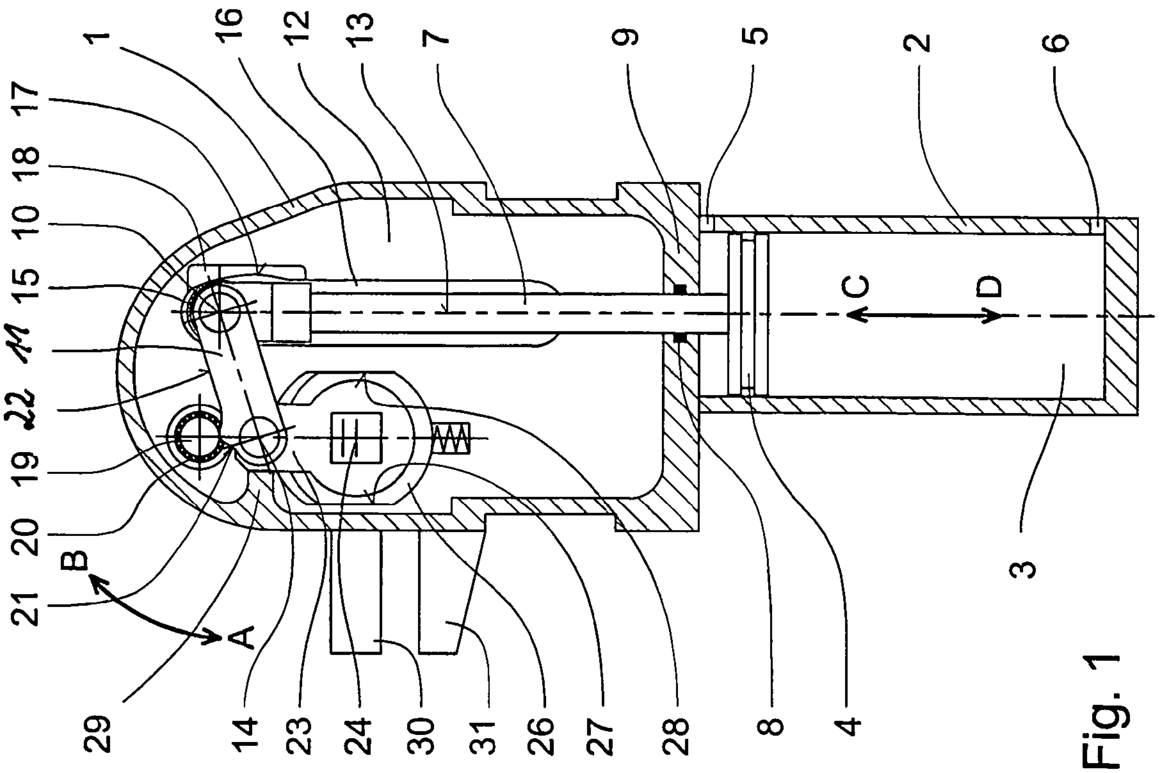
FIG. 1 shows a toggle lever clamp that has a clamping arm in the clamping position, partially cut away in the direction of the longitudinal axis.

The reference numeral 1 refers to a chuck with a dedicated drive unit 2 in the form of a piston-cylinder unit. The drive unit 2 is removably attached to the chuck 1 with threaded fasteners, not shown. A cylinder 3 contains a piston 4 that can slide longitudinally therein in directions C and D, which is sealed therein with sealing elements, not shown. The piston 4 is moved back and forth in the directions C and D by compressed air supplied by a control unit, not shown, connected to the cylinder by air supply lines, also not shown, at the connecting holes 5 and 6.

A rod-shaped actuator 7 is connected to the piston 4, which may have a telescoping design such that its length can be adjusted (also not shown). The actuator 7 can also be composed of individual parts that can be screwed together to adjust its length by adding or removing segments thereof.

An electric motor can also be used instead of the piston-cylinder unit for the drive unit 2, which then moves the actuator 7 back and forth in directions C and D.

In the embodiment shown in the drawings, the actuator 7 passes through a sealing element 8 in the wall of the chuck 1, which also guides the movement of the actuator 7.

An operating lever 11 is attached by a pivot axle 10 to the end of the actuator 7 in the interior 12 of the chuck 1. The longitudinal axis of the pivot axle 10 is orthogonal to the longitudinal axis 13 of the actuator 7. There is a pivot axle 14 at the end opposite the pivot axle 10 about which the force-transferring arm pivots, the longitudinal axis of which is parallel to the longitudinal axis of the pivot axle 10. the pivot axle 10 about which the force-transferring arm pivots, the longitudinal axis of which is parallel to the longitudinal axis of the pivot axle 10.

Rollers extend at both ends of the pivot axle 10 from the operating lever 11, of which only one roller 15 can be seen in the drawing. The rollers are placed in opposing longitudinal grooves in the chuck 1. Only one groove 16 can be seen in the drawing. The longitudinal grooves are formed in halves of the chuck 1 that are placed against one another and held together by removable threaded fasteners, not shown, in a sealed manner, and the parts or halves of the chuck 1 can be sealed against external dust by gaskets, also not shown, or fit tightly against one another along the separating plane.

The longitudinal grooves 16 have a curve 17 at the top. This curve 17 can also be formed by a series of curves. There is also a protective guard 18 in this part of the groove that is made of a durable plastic, hardened steel, or ceramic material, the surface of which is also curved where it faces the rollers 15. As a result, the clamp does not have a dead center position. The protective guard 18 can also be replaced when it becomes worn. The protective guard 18 is attached to the chuck 1 with threaded fasteners or adhesive.

A thrust bearing 19 is fixed in place in the interior 12 of the chuck 1 above the operating lever 11 that can rotate about a needle bearing 20. This thrust bearing 19 has a circular cross section orthogonal to its longitudinal axis.

The thrust bearing 19 has a dedicated actuating lobe 21, integrally formed on the metal operating lever 11, in particular made of a steel alloy, which forms a cam-shaped lobe on the flat side 22 thereof, in the present example in the form of a bead, a cam, or a roller tappet, protruding above the flat side 22.

Figure 3:
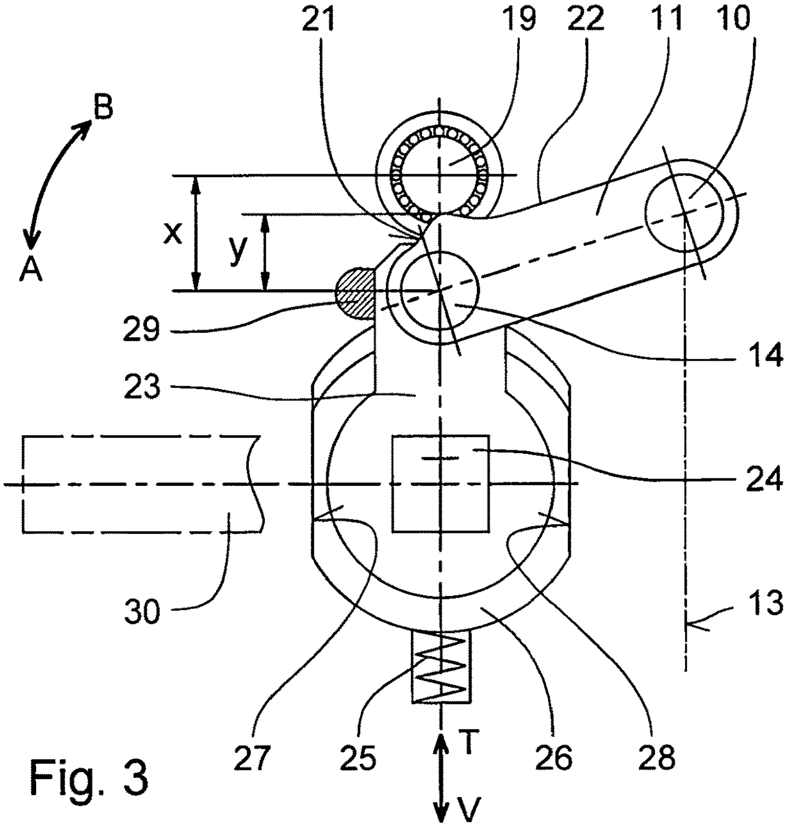
FIG. 3 shows an enlargement of a detail from FIG. 1, broken off in part.
Figure 4:
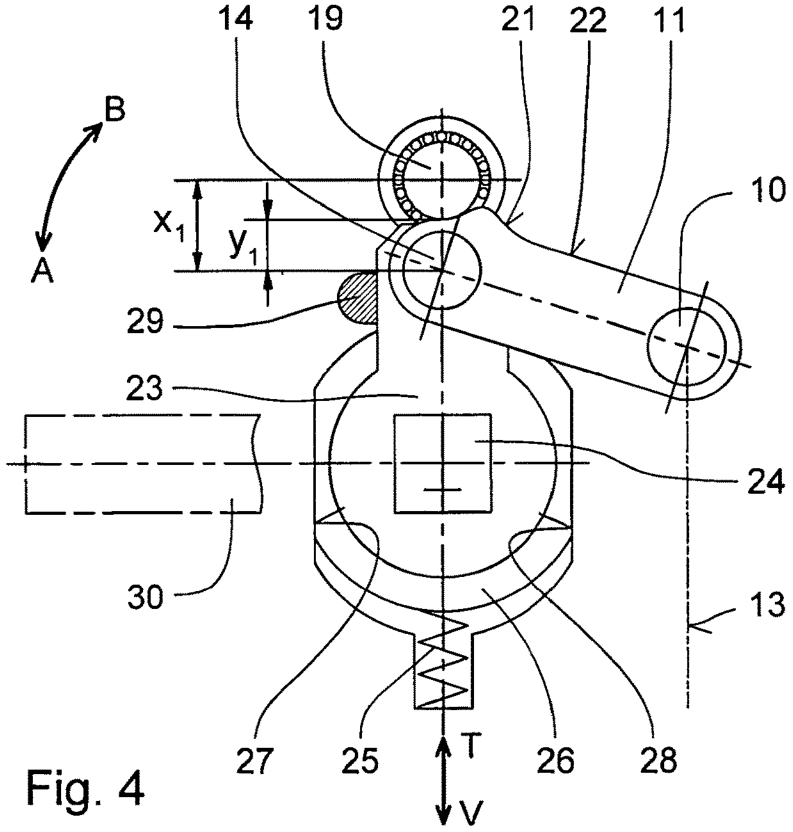
FIG. 4 shows an enlargement of a detail from FIG. 2.

In FIG. 4, the operating lever 11 is pushed upward, in the direction C in the drawing, by compressed air supplied to the piston 4 through the connecting hole 6, such that in the position shown in FIG. 4, the actuating lobe 21 bears on the thrust bearing 19, and then slides along it in a further pivotal movement, illustrated in FIG. 3. As a result, a force-transferring arm 23 is pushed downward (as seen in the drawing) with a force-transferring pivot axle 14 in the direction V (see FIG. 3 and FIG. 4), against the return force of a compression spring 25, which also pushes a force-transferring arm support axle 24 downward, in the direction V, counter to the return force of the compression spring 25.

The clamping arm support axle 24 is supported in a sliding bushing 26 which is supported at opposing side walls 27 and 28 such that it can slide therein. Furthermore, the force-transferring arm 23 is braced against a removable sliding element 29 in a recess on the inside of the chuck 1, such that a defined up and down movement in the direction V-T is obtained.

The drawings clearly illustrate that a two-armed lever is formed when the actuating lobe 21 on the operating lever 11 bears on the thrust bearing 19, resulting in a large leverage ratio that can be applied to the pivot axle 10, such that the clamping arm 30 pivots about the clamping arm support axle 24 in the directions A and B over a 135° angle in the embodiment shown in the illustration.

The illustration also shows that the rotational centers of the force-transferring arm pivot axle 14 and the thrust bearing 19 are coaxially above one another in this embodiment (seen in the drawing plane). In a modification of the embodiment shown in the drawings, the central axis of the thrust bearing 19, the rotational axis of the thrust bearing 19 in the present example, can be offset laterally to the rotational center of the force-transferring arm pivot axle 14 to a certain extent.

The sliding element 29 can be in the form of a pin that is snapped in place in a recess in one or both halves or parts of the chuck 1 (not shown).

The operating lever 11 forms a toggle bar in the illustrated embodiment, the opposite sides of which are flat.

All of the pivot axles 10, 14, and 24 for the rod-shaped actuator and the sliding element 29 are made of a metal in the embodiment shown in the drawings, in particular a steel alloy, as is the thrust bearing 19, which can be in the form of a needle bearing, for example.

The clamping arm support axle 24 protrudes from one or both sides of the chuck 1. The clamping arm 30 is attached to one or both of these ends (with a forked end in the latter case), such that it can be replaced, functionally forming an integral component therewith.

Unlike in the embodiment shown in the drawings, the cylinder 3 can have a stop valve (not shown), which prevents compressed air from escaping the cylinder 3 when in the clamping position.

The distance $X_1$ in the illustrated embodiment is 14 millimeters, and $Y_1$ is 8 millimeters, and the distance X in FIG. 3 is 18 millimeters, and Y is 12 millimeters.

The clamping arm 30 is dedicated to a support element in the form of a jaw 31 for the component that is to be clamped thereon.

The numeral 31 indicates a support element in the form of a jaw for the component that is to be clamped thereon.

The invention claimed is:

1. A clamp for use in manufacturing automobile bodies for the automotive industry that is used to clamp and hold metal plate components in place, comprising a chuck and a pneumatic or electric drive dedicated to the chuck, wherein the drive moves a rod-shaped actuator in opposing vertical directions (C-D), wherein the actuator pivots an operating lever inside the chuck within a predefined angular range about a pivot axle in the chuck at an end of the operating lever, the longitudinal axis of the pivot axle is orthogonal to the longitudinal axis of the rod-shaped actuator, and the operating lever is also pivotally connected to a force-transferring arm by a force-transferring arm pivot axle at an end of the operating lever opposite end of the operating lever provided with the pivot axle, and the force-transferring arm pivots a clamping arm support axle that can move in opposing vertical directions (T-V) in the chuck, and the operating lever is flat on the side facing the end of the chuck and forms a two-armed lever at the upper end of the movement of the rod-shaped actuator with a thrust bearing in the chuck when it is moved downward (V), and the clamping arm exerts a constant or nearly constant clamping force on the metal plate component that is to be clamped in place over a clamping area to the end of the clamp when it moves downward (V), parallel to the upward movement (C) of the rod-shaped actuator, when it comes in contact with the metal plate component, wherein the operating lever has an integrally formed cam-shaped actuating lobe on a flat side of the operating lever facing the thrust bearing in the chuck, which rises smoothly and gradually from the flat side toward the force-transferring arm pivot axle, and imposes a vertical movement (V) on the force-transferring arm and the clamping arm support axle in the chuck when it comes in contact with the thrust bearing, and the force-transferring arm is braced against a shaped sliding element in one or both halves or parts of the chuck, such that a defined vertical movement (V-T) is obtained, wherein the connecting line between the pivotal center of the clamping arm support axle and the force-transferring arm pivot axle forms a straight line in the clamped position, and the extension of this connecting line runs in a straight line through the middle of the thrust bearing.

2. The clamp according to claim 1, wherein the sliding element is snapped in place in the recess in the chuck.

3. The clamp according to claim 1, wherein the parallel movement (V) of the clamping arm is a few millimeters.

4. The clamp according to claim 1, wherein a distance (X) between the centers of the thrust bearing and the force-transferring pivot axle when the operating lever is in the clamping position is 18 millimeters, and the distance (Y) between the pivotal center of the force-transferring pivot axle and the cam-shaped actuating lobe is 12 millimeters, and when the clamping arm is open, the distance (X) is reduced to a distance (X1) of millimeters, and the distance (Y) is reduced from 12 millimeters to 8 millimeters.

5. The clamp according to claim 3, wherein the parallel movement (V) of the clamping arm is ±4 millimeters.

* * * * *